United States Patent
Bridenne et al.

(10) Patent No.: US 8,107,684 B2
(45) Date of Patent: Jan. 31, 2012

(54) METHOD FOR GEOLOCALIZATION OF ONE OR MORE TARGETS

(75) Inventors: Gilles Bridenne, Paris (FR); Michel Prenat, Boulogne (FR)

(73) Assignee: Thales (FR)

( * ) Notice: Subject to any disclaimer, the term of this patent is extended or adjusted under 35 U.S.C. 154(b) by 798 days.

(21) Appl. No.: 12/278,626

(22) PCT Filed: Feb. 7, 2007

(86) PCT No.: PCT/EP2007/051173
§ 371 (c)(1),
(2), (4) Date: Aug. 7, 2008

(87) PCT Pub. No.: WO2007/090848
PCT Pub. Date: Aug. 16, 2007

(65) Prior Publication Data
US 2009/0034795 A1    Feb. 5, 2009

(30) Foreign Application Priority Data
Feb. 8, 2006  (FR) ...................................... 06 01125

(51) Int. Cl.
*G06K 9/00* (2006.01)

(52) U.S. Cl. ........ 382/106; 382/154; 382/285; 382/291; 382/293; 348/42; 348/47; 348/94; 348/113

(58) Field of Classification Search .................. 382/100, 382/106–109, 154, 285, 291, 293–294; 348/42, 348/47–50, 94–95, 113–123
See application file for complete search history.

(56) References Cited

U.S. PATENT DOCUMENTS
4,635,203 A    1/1987  Merchant
(Continued)

FOREIGN PATENT DOCUMENTS
FR    2699666    6/1994
(Continued)

OTHER PUBLICATIONS

U.S. Appl. No. 06/787,707 filed Oct. 16, 1985, abandoned on Jun. 11, 1993.
U.S. Appl. No. 06/296,976, filed Aug. 26, 1981, abandoned on Mar. 13, 1984.
U.S. Appl. No. 06/589,036, filed Mar. 13, 1984, abandoned on Oct. 16, 1985.
(Continued)

*Primary Examiner* — Manav Seth
(74) *Attorney, Agent, or Firm* — Lowe Hauptman Ham & Berner, LLP

(57) ABSTRACT

The subject of the invention is a method for geolocalization of one or more stationary targets from an aircraft by means of a passive optronic sensor. The sensor acquires at least one image $I_1$ containing the target P from a position $C_1$ of the aircraft and an image $I_2$ containing the target P from a position $C_2$ of the aircraft. The images $I_1$ and $I_2$ have an area of overlap. The overlap area has at least one target P identified which is common to the two images $I_1$ and $I_2$. The position of each target P is determined in each of the two images. The distance d is calculated between each target P and a point C, situated for example in the vicinity of $C_1$ and $C_2$, as a function of the angle $\beta_1$ between a reference direction and the line of sight of the image $I_1$, the angle $\beta_2$ between the same reference direction and the line of sight of the image $I_2$, of the position of each target P in the image $I_1$ and in the image $I_2$. The positions of the targets are calculated relative to the projection of the aircraft on the ground when at C, as a function of the distances d in a terrestrial reference frame.

20 Claims, 5 Drawing Sheets

U.S. PATENT DOCUMENTS

| | | | |
|---|---|---|---|
| 4,727,376 A | 2/1988 | Prenat | |
| 4,746,922 A | 5/1988 | Prenat | |
| 4,924,231 A | 5/1990 | Prenat | |
| 5,049,888 A | 9/1991 | Prenat | |
| 5,586,063 A * | 12/1996 | Hardin et al. | 702/142 |
| 5,642,299 A * | 6/1997 | Hardin et al. | 702/142 |
| 6,005,987 A * | 12/1999 | Nakamura et al. | 382/294 |
| 6,694,064 B1 * | 2/2004 | Benkelman | 382/284 |
| 7,684,612 B2 * | 3/2010 | Berrill | 382/154 |
| 7,853,070 B2 * | 12/2010 | Berrill | 382/154 |
| 7,911,503 B2 * | 3/2011 | Kobayashi | 348/222.1 |
| 2002/0181802 A1 * | 12/2002 | Peterson | 382/284 |
| 2002/0191838 A1 * | 12/2002 | Setterholm | 382/154 |
| 2004/0131248 A1 * | 7/2004 | Ito et al. | 382/154 |
| 2007/0237386 A1 * | 10/2007 | Berrill | 382/154 |
| 2007/0297695 A1 * | 12/2007 | Aratani et al. | 382/284 |
| 2008/0056561 A1 * | 3/2008 | Sawachi | 382/154 |
| 2010/0189343 A1 * | 7/2010 | Berrill | 382/154 |
| 2011/0058732 A1 * | 3/2011 | Berrill | 382/154 |

FOREIGN PATENT DOCUMENTS

FR           2719920          11/1995

OTHER PUBLICATIONS

U.S. Appl. No. 06/132,663, filed Apr. 1, 1980, abandoned on Feb. 2, 1996.

U.S. Appl. No. 07/081,803, filed Jul. 21, 1987, abandoned on Jan. 4, 1996.

* cited by examiner

METHOD FOR GEOLOCALIZATION OF ONE OR MORE TARGETS

CROSS-REFERENCE TO RELATED APPLICATIONS

The present Application is based on International Application No. PCT/EP2007/051173, filed on Feb. 7, 2007, which in turn corresponds to French Application No. 06 01125, filed on Feb. 8, 2006, and priority is hereby claimed under 35 USC §119 based on these applications. Each of these applications are hereby incorporated by reference in their entirety into the present application.

TECHNICAL FIELD

The field of the invention is that of the geolocalization of one or more stationary targets and more generally of the georeferencing of an area by means of a passive optronic sensor mounted on an aircraft. A passive optronic sensor is understood to be a sensor without an optical transceiver such as a laser rangefinder.

BACKGROUND OF THE INVENTION

It will be recalled with relation to FIG. 1 that the geolocalization of a stationary target consists in determining the absolute position of the target on the ground, represented by a point P, from the differences in x-coordinate X and y-coordinate Y between the target and the projection $C_0$ on the ground of the aircraft, called the carrier. The position $C_0$ is provided by the navigation system of the aircraft, in general with an error. The angles R and G are respectively the roll angle and the azimuth angle of the line of sight of the target in a terrestrial reference frame. The angles G and R notably depend on the attitude of the aircraft and on the orientation of the line of sight relative to that of the aircraft. They are provided by the navigation system of the aircraft.

FIG. 2 provides a vertical section of FIG. 1 when Y is zero. Except where explicitly mentioned, the remainder of the text is based on this case, without impinging on the generality. This is because the angle G is generally small under the usual operating conditions.

Hence: $X = h \cdot \tan R$      (1)

in which h is the height of the aircraft vertically above $C_0$, and is provided by the navigation system.

The result obtained for X is sensitive to errors in h and R, above all for grazing angles of incidence, i.e. when R is in the vicinity of 90°. Hence, to a first order:

$$\epsilon_X = (\partial X/\partial h)\epsilon_h + (\partial X/\partial R)\epsilon_R$$

$$\epsilon_X/X = \epsilon_h/h + \epsilon_R(1+\tan^2 R)/\tan R$$

For grazing angles of incidence, $1/\tan R \ll \tan R$, finally yielding:

$$\epsilon_X/X = \epsilon_h/h + \epsilon_R \cdot \tan R$$

$\epsilon_X$, $\epsilon_h$, $\epsilon_R$ being respectively the errors in X, h and R.

Hence, for example, for h=1000 m, $\epsilon_h$=0 and X=30 km, an error of 1 mrad in R leads to a geolocalization error of 900 m, i.e. of 3%, which is unacceptable from an operational point of view.

This is because in the case of an application to a reconnaissance system the precision of the geolocalization is a fundamental specification of this system. In the case of a prepared mission, the system must acquire data in an area of the operational theater, defined by its absolute coordinates and designated the target area. An error in geolocalization leads to an increase in the size of the area to be covered in order to be sure that it contains the target area. In addition, it is necessary to know the distance between the sensor and the points to be imaged in order to guarantee the quality of the image (blurring by motion).

Furthermore, a precision in R to within 1 mrad is very difficult to achieve, in particular if the sensor is mounted on a pod which itself moves relative to the aircraft: in this case, an error of several mrad is usual.

In addition, when the ground is uneven and the difference in height between the target and $C_0$ is not known, the formula (1) leads to an even larger error in the measurement of X, as illustrated in FIG. 3. Measured X is obtained in place of X.

Furthermore, atmospheric refraction introduces an additional error in the measurement of X, as illustrated in FIG. 4, yielding measured X in place of X. This error may be around 900 meters.

The aim of the invention is to determine by means of a passive optronic sensor the x-coordinate X with better precision, around 1% for example, notably when the difference in height between the target and $C_0$ is not known and/or in the presence of possible atmospheric refraction.

SUMMARY OF THE INVENTION

To achieve this aim, the invention proposes a method for geolocalization of at least one stationary target P from an aircraft by means of a passive optronic sensor. It is mainly characterized in that it comprises the following steps:
  acquisition by the sensor of at least one image $I_1$ containing the target P from a position $C_1$ of the aircraft and of an image $I_2$ containing the target from a position $C_2$ of the aircraft, these images $I_1$ and $I_2$ having an area of overlap;
  identification in said overlap area of at least one target P common to the two images $I_1$ and $I_2$ and determination of the position of each target P in each of the two images;
  calculation of the distance d between each target P and a point C, of known coordinates relative to $C_1$ and $C_2$, as a function of the angle $\beta_1$ between a reference direction and the line of sight of the image $I_1$, the angle $\beta_2$ between the same reference direction and the line of sight of the image $I_2$, of the position of each target P in the image $I_1$ and in the image $I_2$; and
  P being defined in a terrestrial reference frame by its x-coordinate X and its y-coordinate Y relative to the projection on the ground of the aircraft C, calculation for each target of X and Y as a function of the distances d.

The quantity X thus obtained is independent of the height h, which allows errors in h and the lack of knowledge of the difference in height between the target and $C_0$ to be factored out. It is also almost independent of the effects of atmospheric refraction, in contrast to that obtained by the calculation described in the preamble.

According to one feature of the invention, the position of each target P in the images $I_1$ and $I_2$ is calculated as a number of pixels and respectively converted into an angle $\epsilon_1$ and an angle $\epsilon_2$.

Advantageously, it comprises a step of acquiring the roll angle R and the azimuth angle G of the line of sight in C in a terrestrial reference frame and the position of each target P is also calculated as a function of these roll R and azimuth G angles.

According to another feature of the invention, the distance d is approximately equal to $(B \cdot \cos G)/(\beta_2 - \beta_1 + \epsilon_2 - \epsilon_1)$, B being the distance between the points $C_1$ and $C_2$.

Once the roll angle R and the azimuth angle G have been determined, X is preferably approximately equal to d·cosG·sinR, and Y approximately equal to d·sinG.

For grazing angles of incidence and notably when G is small (cosG close to 1), tan R >>1 and hence the error $\epsilon_X/X$ is almost equal to $\epsilon_d/d$, which allows the demand for precision in the roll angle R to be relaxed. Now, an error in d of around 1% is obtained and hence also an error in X of around 1%.

According to another feature of the invention, the geolocalization is carried out on board the aircraft.

The invention also relates to a method of georeferencing an area, characterized in that it comprises the repetition of the geolocalization method for various targets in the area.

The subject of the invention is also a processing box comprising at least one electronic card, characterized in that at least one electronic card comprises means for implementing the previously described method, along with a reconnaissance pod intended to be installed on an aircraft, characterized in that it comprises such a processing box.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

According to the invention, X is determined by the formula: $X = d \cdot \sin R$ Hence: $\epsilon_X = (\partial X/\partial d)\epsilon_d + (\partial X/\partial R)\epsilon_R$ $\partial X/\partial d = \sin R$ and $\partial X/\partial R = d \cdot \cos R$ $\epsilon_X/X = \epsilon_d/d + \epsilon_R/\tan R$.

For grazing angles of incidence tan R >>1 and therefore: $\epsilon_X/X = \epsilon_d/d$.

In this case, the error in X hence derives solely from the error in d; it is almost independent of the error in R. For a relative error in d of around 1% an error in X of only 300 m is obtained for a target situated 30 km away.

Figure 5:
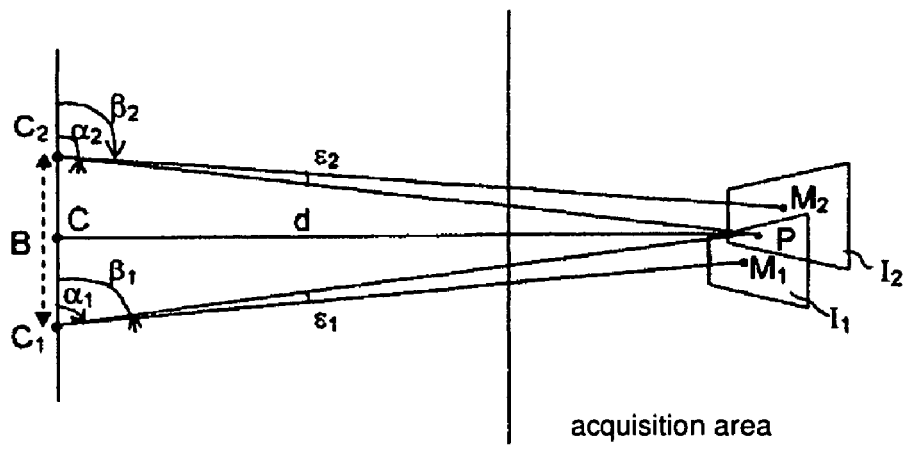
FIG. 5 schematically illustrates an example of the calculation of a distance d by triangulation according to the invention in the particular case of a zero azimuth angle.

According to the invention, the distance d is obtained by triangulation, as illustrated in FIG. 5, in the case of a zero azimuth angle (G=0). The plane of the figure is that of the lines of sight of the aircraft moving between a position $C_1$ and a position $C_2$.

During the acquisition process, the aircraft is successively located at $C_1$ and $C_2$ and the sensor mounted on the aircraft acquires images $I_1$ and $I_2$ respectively which have an area of overlap. To simplify matters, the position of the sensor is equated with that of the aircraft. The images acquired in the acquisition area are not necessarily successive images. The image $I_1$ is, for example, acquired during an outward sweep of the acquisition area and the image $I_2$ during a return sweep. The sensor therefore sights each target P in this area twice, i.e. once per image.

The distance d between this target P and a point C, the coordinates of which are known relative to $C_1$ and $C_2$, is provided approximately by the formula:

$d = B/(\alpha_2 - \alpha_1)$ where B is the distance between $C_1$ and $C_2$ measured by the navigation system, $\alpha_1$, the angle between a reference direction and $C_1P$, $\alpha_2$ the angle between the same reference direction and $C_2P$. The reference direction is, for example, the direction North, or that of the segment $C_1C_2$. In the figure, C is in the middle of $C_1C_2$ but more generally it is situated in the vicinity of $C_1$ and $C_2$.

We have: $\alpha_2 - \alpha_1 = \beta_2 - \beta_1 + \epsilon_2 - \epsilon_1$, these quantities being affected by measurement errors.

$\epsilon_1$, measured by an onboard inertial system, such as a gyroscope for example, is the angle of the line of sight of the image $I_1$, i.e. the angle between a reference direction and $C_1M_1$, where $M_1$ is the center of the image $I_1$, ditto for $\beta_2$ with $M_2$ and $I_2$.

$\epsilon_1$ is the angle between $C_1M_1$ and $C_1P_1$, determined from the position of P relative to the center of $I_1$ measured as the number of pixels, ditto for $\epsilon_2$ with $C_2M_2$ and $I_2$.

Figure 6:
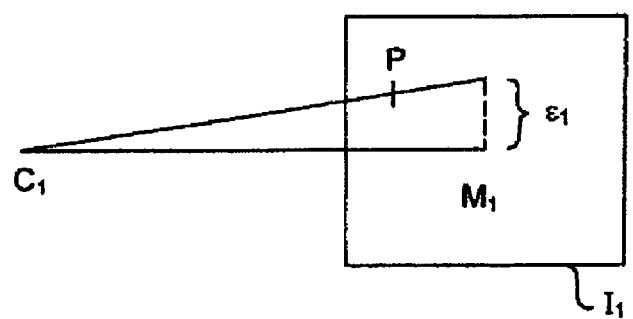
FIG. 6 schematically illustrates a step of calculating an angle $\epsilon_1$ from the position of a target P in an image $I_1$.

In FIG. 6 an image $I_1$ has been represented. The target P is located in this image by its coordinates established as the number of pixels relative to the center $M_1$. As the size of the image measured in pixels corresponds to a specific angle, seen from the aircraft, the angle $\epsilon_1$ is deduced directly from the coordinates of P: $\epsilon_1$ is obtained by converting a number of pixels into an angle.

When, for example, the width of the image comprises 1000 pixels and corresponds to an angle of 1°, the angle $\epsilon_1$ for a target P situated 400 pixels from $M_1$ is 0.4°.

Likewise, the roll angles R associated with various targets P are obtained following the example of the α angles, by summing the roll angles of the lines of sight (equivalent to the βs) and the angles (equivalent to the εs) obtained by converting the roll angle positions of the targets P in the image, these positions being counted in pixels.

The error obtained for d depends on:
- the error in B, measured by the navigation system and which is typically less than 0.3%;
- the error in $\alpha_2-\alpha_1$, called the relative angle, the precision of which is mainly limited by the drift of the inertial system of around 1°/hour and by the random walk of around 0.05°/hour$^{1/2}$; this error is less than 100 μrad in a few seconds. For a distance B of 1000 meters and a distance d of 30 km, the relative error introduced by this term is around 0.3%.

Finally, an error in d of less than 1% is obtained and hence an error in X also less than 1% in the previously described unfavorable conditions (grazing incidence).

With this calculation, the distance X is obtained without it being necessary to acquire the height h, which is also an advantage. However, the height measurement may be used on the condition that sufficient confidence can be attributed to it, for example if it is precise enough and if the difference in height between the target and $C_0$ is known.

This calculation is preferably repeated for several targets P in the overlap area.

Figure 1:
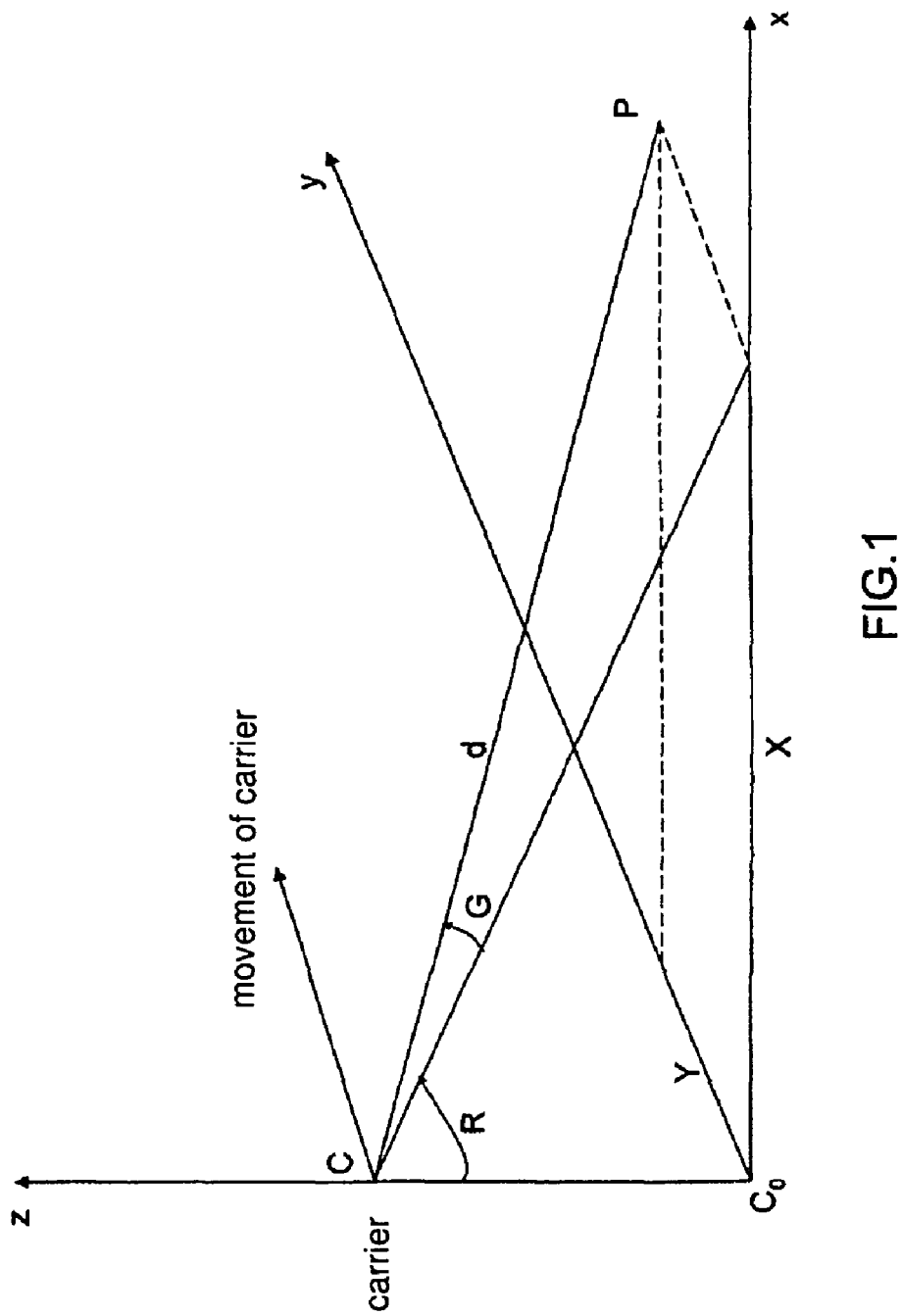
FIG. 1, already described, shows the spatial geometry of the problem posed of geolocalizing a point P.
Figure 2:
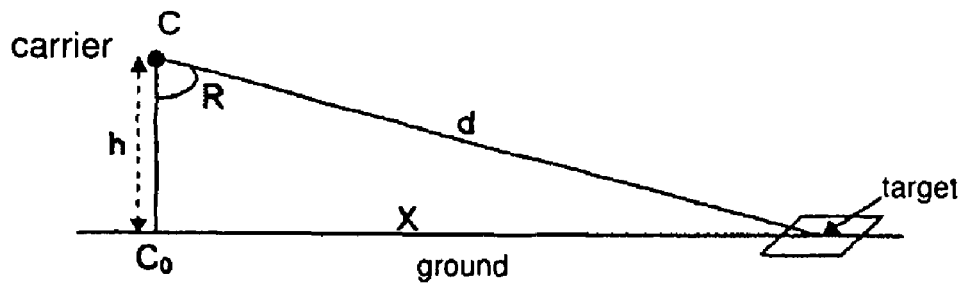
FIG. 2, already described, schematically illustrates the calculation of the difference in the x-coordinate X between a target P and $C_0$ according to the prior art.
Figure 3:
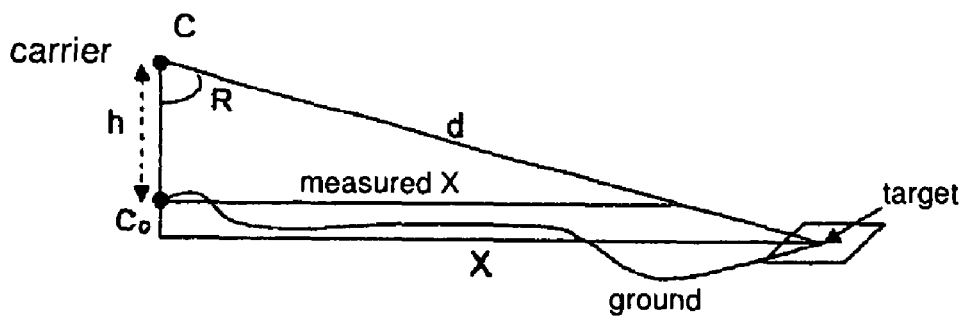
FIG. 3, already described, schematically illustrates the calculation of the measured difference in the x-coordinate X between a target P and $C_0$ according to the prior art when the ground is uneven.
Figure 4:
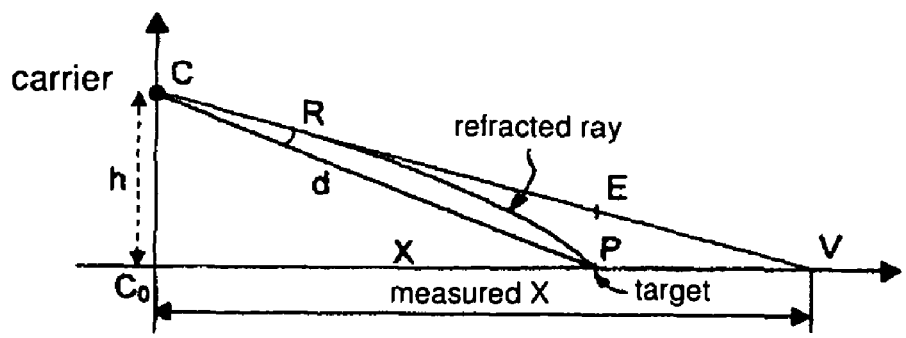
FIG. 4, already described, illustrates the additional error introduced by atmospheric refraction for a geolocalization according to the prior art.
Figure 7:
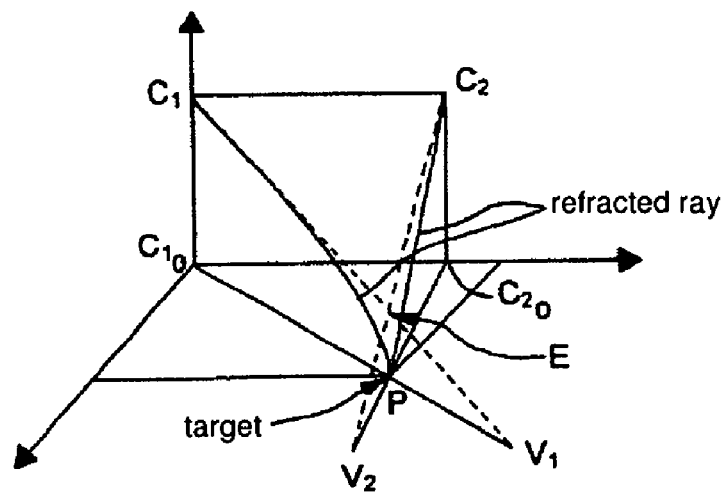
FIG. 7 schematically illustrates the calculation of the distance of a target in the presence of atmospheric refraction in the three dimensions of a terrestrial reference frame according to the invention.

This calculation has another advantage: the distance obtained is almost independent of atmospheric refraction effects, in contrast to that obtained by the calculation described in the preamble. FIG. 4 illustrates the error caused by the concave curvature of the refracted ray coming from the target when the geolocalization is carried out according to the prior art. When the distance is calculated by triangulation according to the invention, the estimated point E of the target is almost vertical to the real target P: E is at the intersection of $C_1V_1$ and $C_2V_2$, $V_1$ and $V_2$ being the points respectively targeted from the aircraft positions $C_1$ and $C_2$, as FIG. 7 illustrates. FIG. 4 is a view of FIG. 7 in a plane containing the points $C_1$, $C_{10}$ and $V_1$ or $C_2$, $C_{20}$ and $V_2$. $C_{10}$ and $C_{20}$ are the projections on the ground of the aircraft positions $C_1$ and $C_2$.

The error introduced by the use of the estimated point E is negligible. Returning to the previous example with an error due to curvature of the ray equal to 900 m, an error in the estimated distance of −9 m is obtained.

Figure 8:
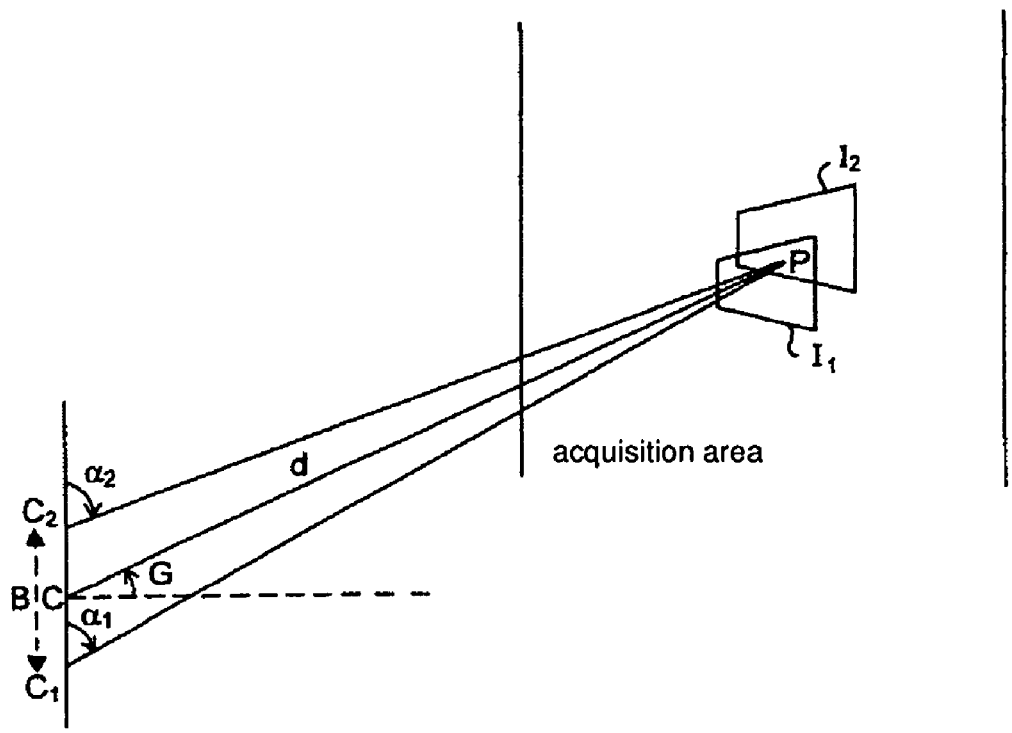
FIG. 8 schematically illustrates an example of the calculation of a distance d by triangulation according to the invention in the case of a nonzero azimuth angle G.

The invention has been described for a zero azimuth angle G; it also applies when the line of sight is off-target by a nonzero azimuth angle G, as FIG. 8 illustrates. In this case, the distance d is approximately equal to $(B \cdot \cos G)/(\alpha_2-\alpha_1)$, or $(B \cdot \cos G)/(\beta_2-\beta_1+\epsilon_2-\epsilon_1)$. And hence:

$$X = d \cdot \cos G \cdot \sin R$$

$$Y = d \cdot \sin G$$

According to the invention, georeferencing of an area is also carried out by applying this method of geolocalization to several targets in the area to be referenced and by interpolating for the other targets in the area.

Figure 9:
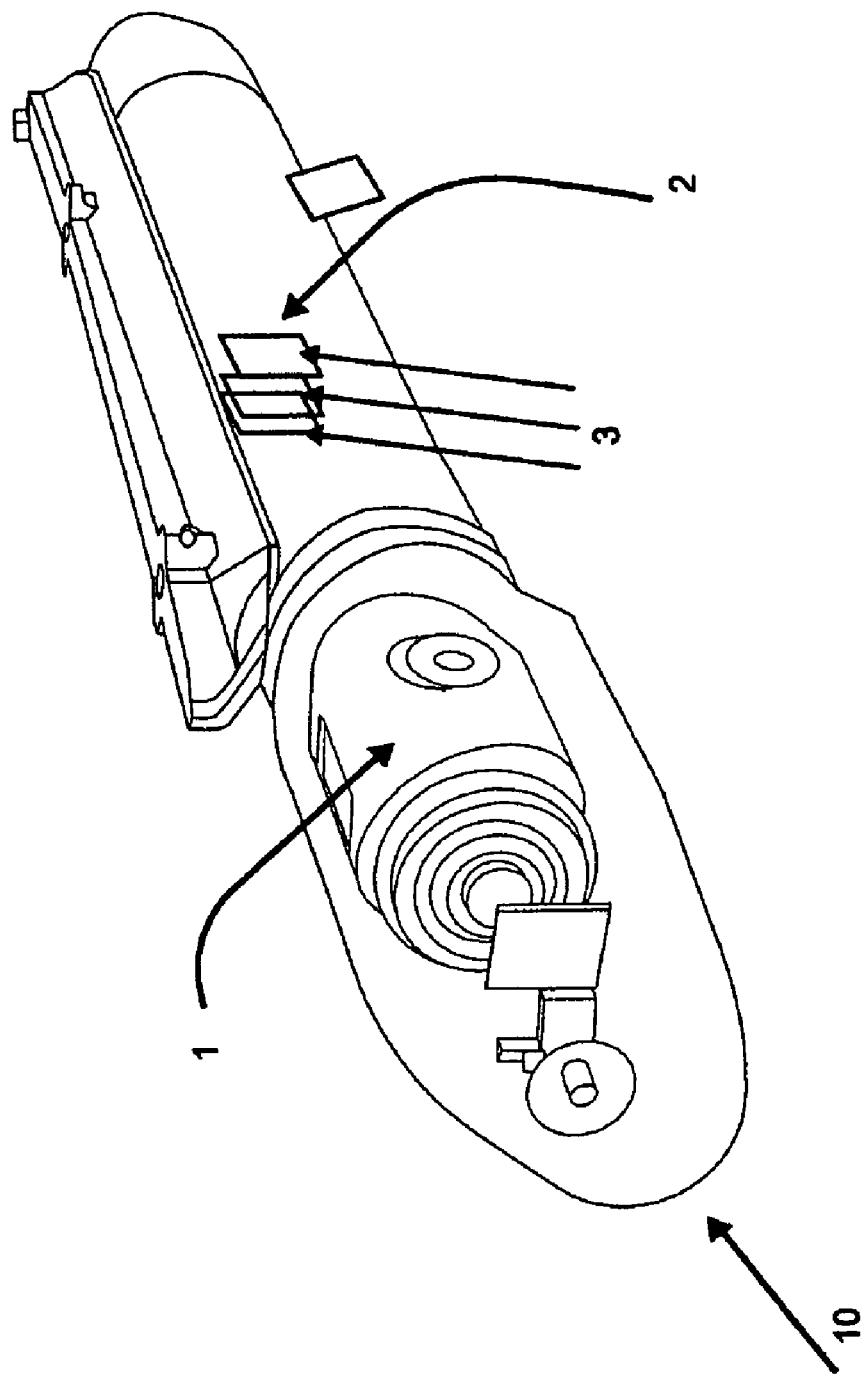
FIG. 9 schematically illustrates a reconnaissance pod according to the invention.

According to one embodiment, the method according to the invention is applied in a reconnaissance pod mounted on an aircraft. The pod 10, represented in FIG. 9, comprises a passive optronic sensor 1 and a processing box 2 which comprises electronic processing cards 3. In conventional manner, the sensor is adjustable and acquires the images; the method is applied by software implemented on one or more of the electronic cards.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for geolocalization of at least one stationary target P from an aircraft by means of a passive optronic sensor and by software implemented on electronic cards, said method comprising the following steps:
    acquiring by a sensor of at least one image $I_1$ containing the target P from a position $C_1$ of the aircraft and of an image $I_2$ containing the target P from a position $C_2$ of the aircraft, the images $I_1$ and $I_2$ having an area of overlap;
    identifying in said overlap area of the target P common to the two images $I_1$ and $I_2$ and determination of the position of the common target P in each of the two images;
    calculating a distance d between a point C, of coordinates relative to $C_1$ and $C_2$, and the target P, as a function of the angle $\beta_1$ between a reference direction and the line of sight of the image $I_1$, the angle $\beta_2$ between the same reference direction and the line of sight of the image $I_2$, and of the position of the target P in the image $I_1$ and in the image $I_2$; and
    P being defined in a terrestrial reference frame by its x-coordinate X and its y-coordinate Y relative to the projection on the ground of the aircraft C, calculating X and Y for the target P as a function of the distance d.

2. The geolocalization method as claimed in claim 1, wherein the position of the target P in the images $I_1$ and $I_2$ is calculated as a number of pixels and respectively converted into an angle $\epsilon_1$ and an angle $\epsilon_2$.

3. The geolocalization method as claimed in claim 1, wherein, the line of sight in C has a roll angle R and an azimuth angle G in a terrestrial reference frame, and said method further comprises a step of acquiring the roll angle R and the azimuth angle G and in that the position of the target P is calculated as a function of these roll R and azimuth G angles.

4. The geolocalization method as claimed in claim 3, wherein the distance d is approximately equal to $$(B \cdot \cos G)/(\beta_2-\beta_1+\epsilon_2-\epsilon_1),$$

B being the distance between the points $C_1$ and $C_2$.

5. The geolocalization method as claimed in claim 3, wherein, once the roll angle R and the azimuth angle G have been determined, the position of the target P relative to the projection on the ground of the aircraft in C is given by $X = d \cdot \cos G \cdot \sin R$ and $Y = d \cdot \sin G$.

6. The geolocalization method as claimed in claim 1, wherein the geolocalization is carried out on board the aircraft.

7. A method of georeferencing an area, comprising the repetition of the geolocalization method as claimed in claim 1 for various targets in the area.

8. A processing box comprising at least one electronic card, having at least one electronic card comprising means for implementing the method as claimed in claim 1.

9. A reconnaissance pod intended to be installed on an aircraft, comprising a processing box as claimed in claim 8.

10. The geolocalization method as claimed in claim 2, wherein, the line of sight in C has a roll angle R and an azimuth angle G in a terrestrial reference frame, and said method further comprises a step of acquiring the roll angle R and the azimuth angle G and in that the position of the target P is calculated as a function of these roll R and azimuth G angles.

11. The geolocalization method as claimed in claim 4, wherein, once the roll angle R and the azimuth angle G have been determined, the position of the target P relative to the projection on the ground of the aircraft in C is given by $X = d \cdot \cos G \cdot \sin R$ and $Y = d \cdot \sin G$.

12. The geolocalization method as claimed in claim 2, wherein the geolocalization is carried out on board the aircraft.

13. The geolocalization method as claimed in claim 3, wherein the geolocalization is carried out on board the aircraft.

14. The geolocalization method as claimed in claim 4, wherein the geolocalization is carried out on board the aircraft.

15. The geolocalization method as claimed in claim 5, wherein the geolocalization is carried out on board the aircraft.

16. The geolocalization method as claimed in claim 7, wherein the position of the target P in the images $I_1$ and $I_2$ is calculated as a number of pixels and respectively converted into an angle $\epsilon_1$ and an angle $\epsilon_2$.

17. The geolocalization method as claimed in claim 7, wherein, the line of sight in C has a roll angle R and an azimuth angle G in a terrestrial reference frame, and said method further comprises a step of acquiring the roll angle R and the azimuth angle G and in that the position of the target P is calculated as a function of these roll R and azimuth G angles.

18. The geolocalization method as claimed in claim 17, wherein the distance d is approximately equal to $$(B \cdot \cos G)/(\beta_2 - \beta_1 + \epsilon_2 - \epsilon_1),$$

B being the distance between the points $C_1$ and $C_2$.

19. The geolocalization method as claimed in claim 17, wherein, once the roll angle R and the azimuth angle G have been determined, the position of the target P relative to the projection on the ground of the aircraft in C is given by $X = d \cdot \cos G \cdot \sin R$ and $Y = d \cdot \sin G$.

20. The geolocalization method as claimed in claim 17, wherein the geolocalization is carried out on board the aircraft.

* * * * *